United States Patent [19]

Jabarin

[11] 4,154,920
[45] May 15, 1979

[54] METHODS FOR PRODUCING IMPROVED STABLE POLYETHYLENE TEREPHTHALATE

[75] Inventor: Saleh A. Jabarin, Sylvania, Ohio

[73] Assignee: Owens-Illinois, Inc., Toledo, Ohio

[21] Appl. No.: 885,702

[22] Filed: Mar. 13, 1978

[51] Int. Cl.² ............................................. C08G 63/26
[52] U.S. Cl. ..................................... 528/272; 528/480
[58] Field of Search .......................... 260/75 M, 75 T; 528/272, 480

[56] References Cited

U.S. PATENT DOCUMENTS

| | | | |
|---|---|---|---|
| 2,933,476 | 4/1960 | Fisher | 260/75 M |
| 3,390,134 | 6/1968 | Kibler | 260/75 M |
| 3,634,356 | 1/1972 | Tryon | 260/75 M |
| 3,718,621 | 2/1973 | Wilson | 260/75 M |
| 3,842,040 | 10/1974 | Browne et al. | 260/75 M |
| 3,969,324 | 7/1974 | Berkau | 260/75 T |

*Primary Examiner*—Lucille M. Phynes
*Attorney, Agent, or Firm*—Richard D. Heberling; Myron E. Click; David H. Wilson

[57] ABSTRACT

Methods for producing improved, thermally-stable polyethylene terephthalate resins are provided. Polyethylene terephthalate resins are provided that can be fabricated into products such as carbonated beverage containers with a minimum of degradation products such as acetaldehyde preferably by rapidly polymerizing a prepolymer from an i.v. of about 0.2 to an i.v. of at least about 0.7.

28 Claims, 2 Drawing Figures

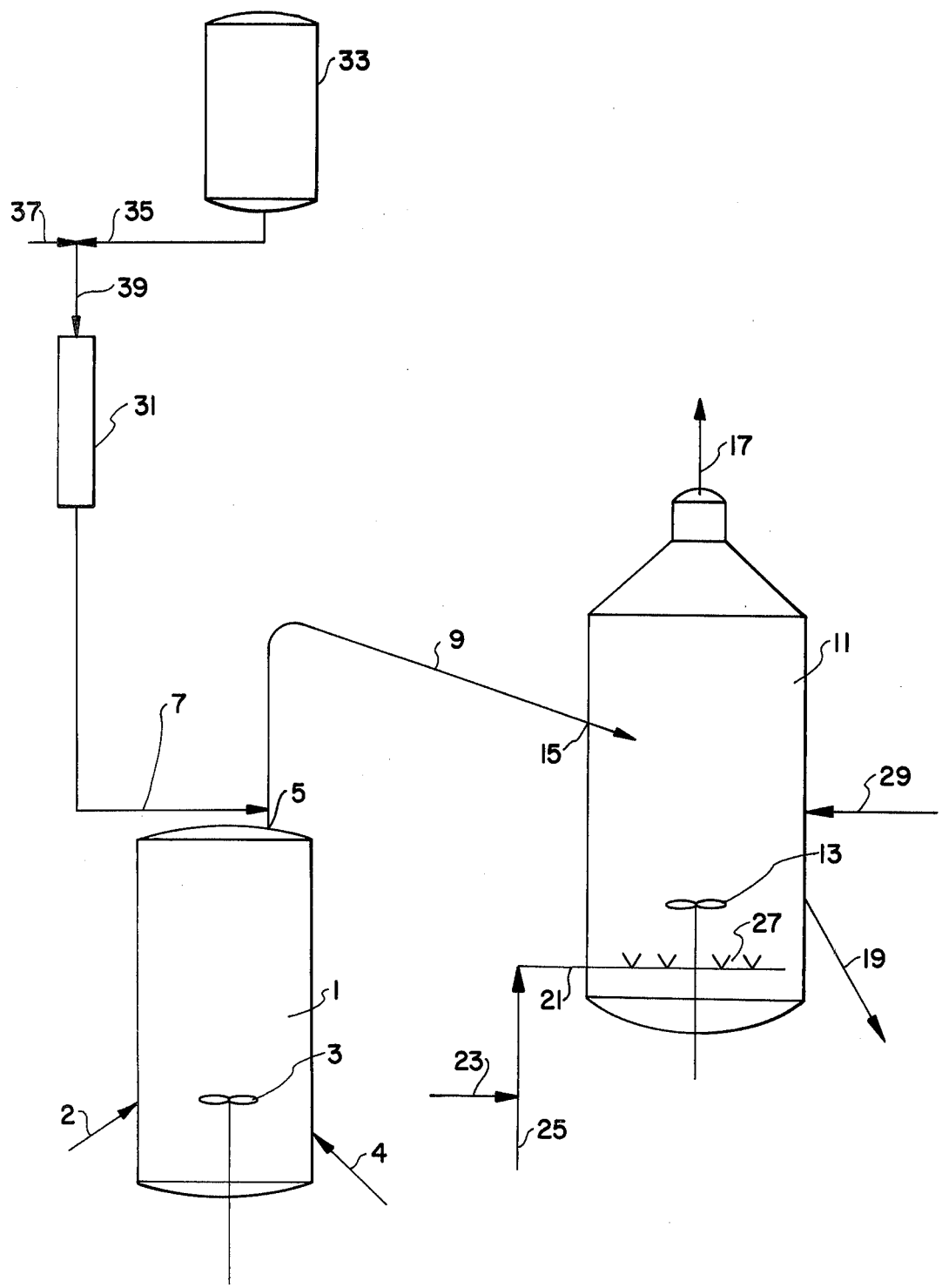

METHODS FOR PRODUCING IMPROVED STABLE POLYETHYLENE TEREPHTHALATE

THE INVENTION

The production of polyethylene terephthalate resins is disclosed in U.S. Pat. No. 2,465,319 to Whinfield, et al. One process for the production of the resin includes carrying out an ester interchange between ethylene glycol in excess and dimethyl terephthalate to form bis-2-hydroxy-terephthalate and its oligomers which in turn is further polymerized to a high-molecular weight resin generally under reduced pressure and at elevated temperatures. The term "prepolymer" is generally employed to designate the low-molecular weight polyethylene terephthalate having an intrinsic viscosity (i.v.) generally about 0.2.

In the present invention, the starting prepolymer material preferably has an intrinsic viscosity of about 0.15 to 0.25 and optimally about 0.2, although the i.v. can range from about 0.1 to 0.3. The above-described prepolymer is disclosed; for instance, in U.S. Pat. No. 2,933,476 where the prepolymer is continuously fed to a final polymerization apparatus to provide a final product.

In the past, as previously indicated, the prepolymer has been further polymerized to a polymer having an i.v. of 0.7 to 1.0 or more. Apparatus for the continuous polymerization of polyethylene terephthalate is shown in the Vodonik U.S. Pat. No. 2,758,915.

It is important to provide carbonated beverage containers of polyethylene terephthalate that have a reduced amount of acetaldehyde and other degradation products.

It is an object of the present invention to provide a method of providing an improved, thermally-stable polyethylene terephthalate resin starting with a low-molecular weight prepolymer having an intrinsic viscosity of generally about 0.2 in which the method comprises the steps of: (A) Further polymerizing the prepolymer in a melt state to a higher intrinsic viscosity in a range of about 0.4 to 0.6 at a temperature of about 270° C. to 290° C. at a high reaction rate for less than about one-half hour, and (B) Further polymerizing the reaction product of Step (A) in a solid state to provide a stable resin with a reduced amount of acetaldehyde and having an intrinsic viscosity of at least about 0.7.

It is an object of the present invention to provide a method of producing an improved, thermally-stable polyethylene terephthalate resin from a prepolymer having an intrinsic viscosity of generally about 0.2 by: (A) Further polymerizing the prepolymer in a melt state to a higher intrinsic viscosity of about 0.4 to 0.6 at a temperature of about 270° C. to 290° C. at a high reaction rate for less than about one-half hour by forming a liquid film of the prepolymer and heating the film to provide the stable polymer having reduced content of acetaldehyde and other degradation products, and (B) Further polymerizing the product of Step (A) to provide the stable resin having an intrinsic viscosity of at least about 0.7.

It is an object of the present invention to provide a method of providing an improved, thermally-stable polyethylene terephthalate resin from the prepolymer having a low molecular weight with an intrinsic viscosity in the neighborhood of about 0.2, the method comprising the steps of: (A) Further polymerizing the prepolymer in a melt state from a lower intrinsic viscosity to a higher intrinsic viscosity of at least about 0.7 at a temperature of 270° C. to 290° C. at a very high reaction rate by forming a film of the prepolymer having a viscosity equivalent to that of about 3000 to 9000 poises at a range of 270° C. to 290° C. at zero shear rate and heating the film to provide the stable polymer.

It is an object of the present invention to provide a method of providing an improved, thermally-stable polyethylene terephthalate resin from a low-molecular weight prepolymer such as one having an intrinsic viscosity of about 0.2, the method comprising the steps of: (A) Further polymerizing the prepolymer at 270° C. to 290° C. for a time greater than an hour and less than about three hours to provide a solid reaction product having an intrinsic viscosity of about 0.4 to 0.5; and (B) Further polymerizing the product of Step (A) in a solid state at 200° C. to 240° C. to provide a stable resin having a reduced acetaldehyde content and having an intrinsic viscosity of at least about 0.7.

These and other objects will be apparent in the specification that follows the appended claims and from the drawings in which:

FIG. 1 is a fragmentary front elevational view partly in a section of a wiped film reactor used to form a liquid film of a polyethylene terephthalate prepolymer and heat the resultant film to ultimately provide a thermally-stable polyethylene terephthalate resin that has a reduced content of acetaldehyde and other degradation products; and FIG. 2 is a fragmentary sectional view taken on the line 2—2 of FIG. 1 and on the larger scale than FIG. 1.

The present invention provides a method of producing an improved, thermally-stable polyethylene terephthalate resin from a low-molecular weight prepolymer having an intrinsic viscosity of about 0.1 to 0.3, the method comprises the steps of: (A) Further polymerizing in a melt state the prepolymer to an intrinsic viscosity of about 0.4 to 0.6 at a temperature of about 270° C. to 290° C. at a very high reaction rate for substantially less than about one-half hour and preferably between 10 and 20 minutes; and (B) Further polymerizing the reaction product of Step (A) in a solid state at a temperature generally of about 200° C. to 240° C. to provide a thermally stable resin with reduced acetaldehyde content, the resin having an intrinsic viscosity of at least about 0.7.

The present invention also provides a method of producing an improved, thermally-stable polyethylene terephthalate resin from a prepolymer having a low molecular weight and having an intrinsic viscosity of about 0.1 to about 0.3, the method comprising the steps of: (A) Further polymerizing the prepolymer in a melt state from a lower intrinsic viscosity to a higher intrinsic viscosity of about 0.7 at a temperature of about 270° C. to 290° C. at a high reaction rate for less than about one-half hour and preferably between 20 and 25 minutes by forming a thin film of the prepolymer and heating the same to thereby provide a thermally-stable polyethylene terephthalate resin.

The present invention also provides a method of producing an improved, thermally-stable polyethylene terephthalate resin from a low molecular weight prepolymer of ethylene glycol and terephthalic acid having an intrinsic viscosity of about 0.1 to about 0.3, the method comprising the steps of: (A) Further polymerizing the prepolymer in a melt state at about 270° C. to 290° C. for time greater than about one hour and less than about three hours to provide a solid reaction product having an intrinsic viscosity of about 0.4 to 0.5; and (B) Further polymerizing in a solid state the product of Step (A) at about 200° to 240° C. to provide a stable resin having a reduced acetaldehyde content and having an intrinsic viscosity of at least about 0.7.

The above-described method of preparing a stable polyethylene terephthalate resin having a reduced acetaldehyde content is preferably carried out by introducing a melt prepolymer feed of polyethylene terephthalate having an intrinsic viscosity of about 0.2 into a wiped film reactor 1 having a chamber wall 5 with an inner surface 6 thereof. As indicated above, the liquid film 10 of the prepolymer feed is formed and the resultant film 10 heated as it flows down the chamber wall 5 at a film temperature of about 270° C. to 290° C. to further polymerize by polycondensation the polyethylene terephthalate and at the same time evaporate or remove glycol to thereby increase the intrinsic viscosity of the polyethylene terephthalate. As seen in the drawings, the film 10 in the reactor is wiped by four blades 15 that project from an integral hollow central portion having a square cross-sectional outline mounted on a square shaft 17 which is driven by means not shown to provide a wiping action on the film being polycondensed. The blades 15 are equally spaced around the periphery of the shaft and extend longitudinally near the entire length of the lower cylindrical portion 19 of the reactor 1. The prepolymer is fed in through inlet 21 and the polycondensed prepolymer leaves the reactor through outlet 23. Glycol stripped off is removed through vapor exit 24 of an upper portion 25 of the reactor. The concentric chamber 27 is provided around the lower portion 19 of the reactor for heating the wall 5. The heating fluid, preferably steam, is fed in through inlet 29 as it leaves through outlet 31. As best seen in FIG. 2, a wave 32 of liquid film 10 is built up ahead of each of the blades 15 and pushed thereby, the blade acting as a wiper blade to provide the wiping and polycondensation action.

The methods of the present invention provide a stable polyethylene terephthalate that has the capability of being formed into hollow articles including carbonated beverage containers having a reduced content of acetaldehyde as well as other degradation products. In other words, as the polymer is fabricated into articles by injection molding and/or extrusion, the degradation products, such as acetaldehyde produced as a result of melting, will be minimized.

According to the present invention, it has been found that the generation of acetaldehyde and other degradation products during injection molding and/or extrusion of polyethylene terephthalate resin is governed by the total thermal history; i.e., temperature and time of polycondensation, of the resin in addition to the temperature and residence time used in the processing of the resin to produce fabricated articles.

In a brochure of the Luwa Corporation in 1976 entitled "A Breakthrough in High-Viscosity Processing from the Leader in Thin-Film Technology," the polycondensation of polyethylene terephthalate is mentioned in FIG. 20, it showing the increase in intrinsic viscosity as a function of residence time in a polycondensation of polyethylene terephthalate. However, there is no suggestion of the need to proceed with the polycondensation of the prepolymer at a very high rate to provide a polymer having an i.v. of about 0.4 to 0.6 and then further polymerizing the resultant polymer in a solid state to a stable polymer having an i.v. of at least about 0.7. There is no suggestion of polymerizing in a melt state a prepolymer having an i.v. of about 0.2 to a stable polymer having an i.v. of at least about 7 in less than one-half hour.

By rapidly condensing the prepolymer, preferably by forming a thin film and heating the same for 10 to 20 minutes, the generation of acetaldehyde is held down. In addition, the generation of acetaldehyde and other degradation products during processing of the polymer; i.e., injection molding or extrusion, will also be minimized.

The polycondensation of the prepolymer can be carried out at a high reaction rate using thin-film or wiped-film reactors such as shown in the Luwa AG U.S. Pat. Nos. 3,625,273 and 3,678,983.

In U.S. Pat. No. 3,414,540, a wiped-film evaporator was used to strip off alcohol and water to further cure a curable organo-polysiloxane. However, this patent has no suggestion of the need to provide a high reaction rate for the further polymerizing of a polyethylene terephthalate prepolymer as described herein.

The intrinsic viscosity used herein generally is measured by using a sample concentration of 0.25 grams per 100 ml measured in a 60-40 phenol-tetrachloroethane solvent at 25° C.

There are chemical variables such as the intrinsic viscosity, the particular polymerization process such as melt phase or solid phase, the catalyst system, including lead oxide, antimony glycolate, and antimony acetate, the stabilizer system including phosphorous-containing compounds all of which can have some influence on the acetaldehyde generated. However, by following the process of the present invention, improved, thermally-stable resins are prepared by forming a film and rapidly heating the film in the melt polymerization stage of a preferred two-stage process (melt polymerization followed by solid state polymerization). For an intrinsic viscosity (i.v.) of 0.4 at zero shear rate, viscosity of the film is about 365 poises at 270° C. and about 220 poises at 290° C. At an intrinsic viscosity of about 0.5 at zero shear rate, the viscosity of the film is about 1120 poises at 270° C. and about 684 poises at 290° C. The viscosity at zero shear rate for a 0.6 i.v. polymer is about 2795 poises at 270° C. and about 1707 poises at 290° C.

As to the final product; for instance, one having a 0.7 i.v. at zero shear rate, the viscosity in poises is about 9000 at 270° C. and about 3000 at 290° C. Again, for a 0.7 i.v. polymer, the viscosity is about 3000 poises at a shear rate of 680 sec$^{-1}$ at 290° C., about 2500 poises at 1370 sec$^{-1}$ shear rate, about 2000 poises at 3430 sec$^{-1}$ shear rate, and about 1500 poises at 6860 sec$^{-1}$ shear rate.

In a two-stage process in which there is melt polymerization followed by solid-state polymerization, it is important to rapidly process the prepolymer in the melt polymerization stage, preferably by forming the prepolymeer film and heating the same at 270° C. to 290° C. for no more than one-half hour at preferably from about 5 to 20 minutes and optimally about 10 to 15 or 18 minutes.

The film is generally about one-half to 150 or 200 mils in thickness and preferably about 5 to 30 mils. In accordance with the present invention, the preferred process of making the thermally-stable polyethylene terephthalate resin involves starting with the prepolymer having an intrinsic viscosity of about 0.2, further polymerizing this prepolymer in a melt state quickly in a wiped-film reactor to an intermediate i.v. of about 0.4 or 0.45 to 0.55 or 0.6. The intermediate product is further polymerized in a solid state to an i.v. of about 0.7 or higher; in order words, 0.75, 0.8, 0.9, 1.0, 1.04 or more.

Another method of making the stable polyethylene terephthalate resin according to the present invention which is highly advantageous, although not as good from the standpoint of controlling the reaction as the aforementioned preferred process, includes starting with a prepolymer in a melt phase using a wiped-film reactor to provide rapidly a final polymer having an i.v. of 0.7 or more.

The least preferred method is that of processing a prepolymer of having an i.v. of about 0.2 by melt phase polymerization to an intermediate product and then proceeding in a solid state polymerization to a polymer with an i.v. of 0.7 or more. In this process, the melt polymerization stage is conducted in a time of greater than about one hour and less than about three hours, preferably about 1 ½ to 2 ½ hours, and optimally about two hours. The polycondensation temperatures of the melt polymerization stage is generally about 270° C. to 290° C. and preferably about 275° C. to 285° C., and the temperature of the solid state polymerization is about 200° C. to 240° C. and preferably about 210° C. to 230° C.

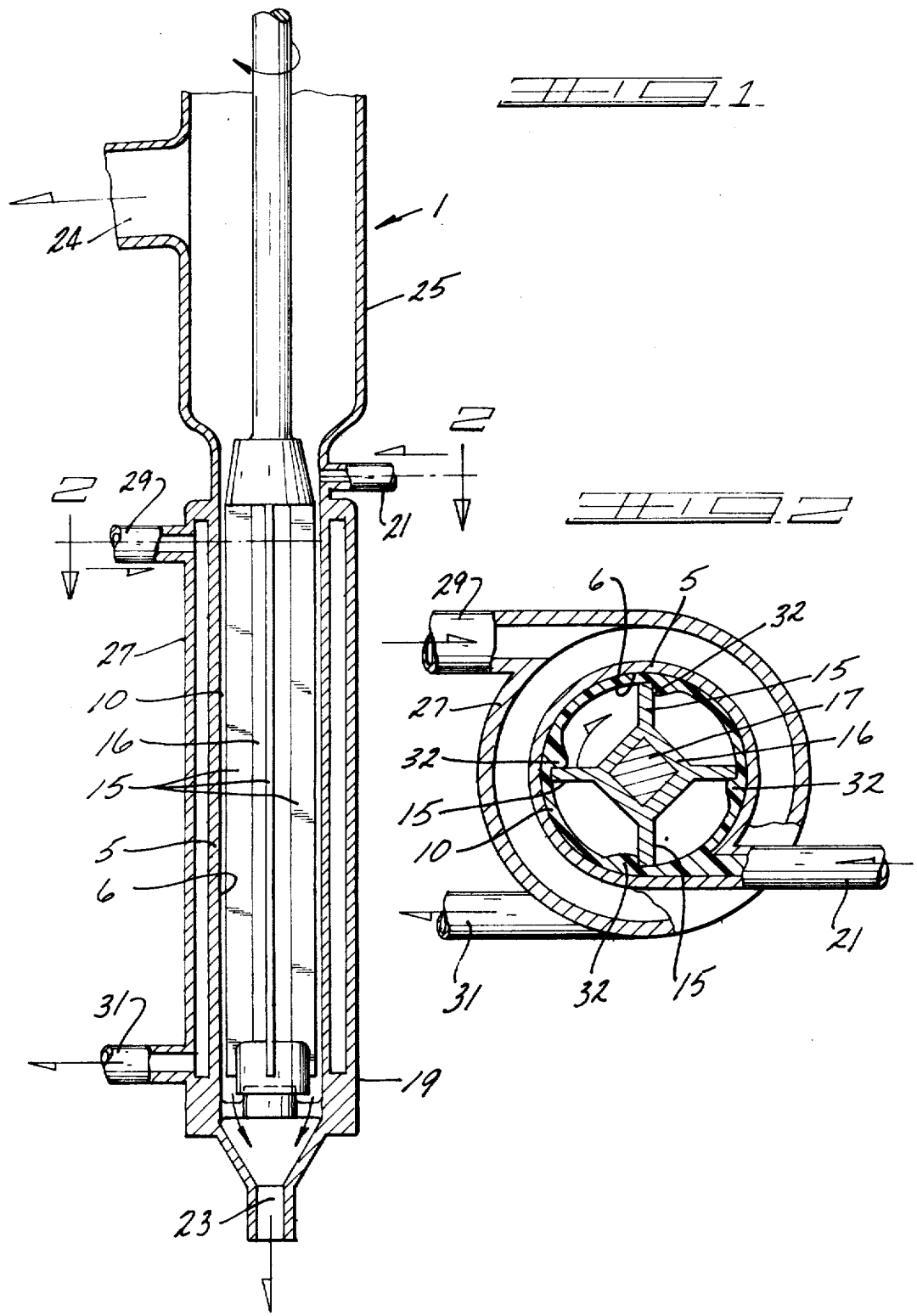

What is claimed is:

1. A method of producing an improved, stable, polyethylene terephthalate resin from a low-molecular weight prepolymer of ethylene glycol and terephthalic acid having an intrinsic viscosity of about 0.1 to 0.3, the method comprising the steps of: (A) Further polymerizing the prepolymer to a higher intrinsic viscosity of about 0.4 to 0.6 at a temperature of about 270° C. to 290° C. at a high reaction rate for less than about one-half hour; and (B) Further polymerizing the reaction product of Step (A) in a solid state to provide a stable resin with an intrinsic viscosity of at least about 0.7.

2. A method as defined in claim 1 including the additional steps forming an article from the stable polyethylene terephthalate resin of Step (B).

3. A method as defined in claim 1 and which the further polymerizing of Step (A) is done in a wiped-film reactor.

4. A stable polyethylene terephthalate resin made according to the method of claim 1 having an acetaldehyde content that is reduced.

5. A method as defined in claim 1 in which the further polymerizing in Step (B) is conducted in a temperature of about 200° C. to 240° C.

6. A method as defined in claim 1 in which the reaction time of Step (A) is about one-quarter hour.

7. A method as defined in claim 1 in which the further polymerizing of Step (A) includes forming a liquid film of the prepolymer and heating film to provide a further polymerizable prepolymer having a viscosity equivalent to that of about 200 to 400 poises at a temperature range of about 270° C. to 290° C.

8. A method as defined in claim 7 in which the film has a thickness of about one-half to 200 mils.

9. A method as defined in claim 7 in which the further polymerizable prepolymer has a viscosity equivalent to that of about 365 poises at 270° C. at zero shear rate.

10. A method of providing an improved thermally stable polyethylene terephthalate prepolymer of ethylene glycol and terephthalic acid from a relatively low-molecular weight resin having an intrinsic viscosity of about 0.1 to 0.3, the method comprising the steps of: (A) Further polymerizing the prepolymer in a liquid state from a lower intrinsic viscosity to an intrinsic viscosity of at least 0.7 at a temperature of about 270° C. to 290° C. at a higher reaction rate for less than about one-half hour to provide a thermally-stable polyethylene terephthalate resin.

11. A method as defined in claim 10 in which the reaction time is about one-quarter hour.

12. A method as defined in claim 10 employing the further step of further polymerizing the product of Step (A) in a solid state to provide a resin with an i.v. of at least about 0.8.

13. A method as defined in claim 10 including the additional step forming an article from the stable polyethylene terephthalate resin.

14. A method as defined in claim 10 in which the further polymerizing of Step (A) is accomplished in a wiped-film reactor.

15. A stable polyethylene terephthalate resin made according to the method of claim 10 having an acetaldehyde content that is reduced.

16. A method as defined in claim 10 in which the further polymerizing of Step (A) includes forming a liquid film of the prepolymer and heating the film to provide a stable polymer resin having a viscosity equal to about 3000 to 9000 poises at a range of 270° C. to 290° C. to zero shear rate.

17. A method as defined in claim 16 in which the film has a thickness of about one-half to 200 mils.

18. A method as defined in claim 16 in which the polymer of the film has a viscosity equivalent to that of about 3000 poises at 290° C. at zero shear rate.

19. A method as defined in claim 16 in which the film has a viscosity equivalent to that of about 1500 to 3000 poises at 290° C. at a shear rate of about 680 sec$^{-1}$ to 6860 sec$^{-1}$.

20. A method of producing an improved, stable, polyethylene terephthalate resin from a low-molecular weight prepolymer of ethylene glycol and terephthalic acid having an intrinsic viscosity of about 0.2, the method comprising the steps of (A) Further polymerizing the prepolymer at about 270° C. to 290° C. for a time greater than about one hour and less than about three hours to provide a product having an intrinsic viscosity of about 0.4 to 0.5, and (B) Further polymerizing the product of Step (A) in a solid state at about 200° C. to 240° C. to provide a stable resin having an intrinsic viscosity of at least about 0.7.

21. A method as defined in claim 20 in which the further polymerizing of Step (A) is accomplished in about two hours.

22. A method as defined in claim 20 including the further step of forming the product of Step (B) into a solid article.

23. A method as defined in claim 2 in which there is included a further step of forming a bottle from the product of Step (B).

24. A method as defined in claim 2 in which the stable resin has an intrinsic viscosity of about 0.9.

25. A stable polyethylene resin made according to the method of claim 20 that has a reduced acetaldehyde content.

26. A method as defined in claim 20 in which the further polymerizable prepolymer product of Step (A) has, at a zero shear rate, a viscosity equivalent to that of about 200 to 400 poises at a temperature range of 270° C. to 290° C.

27. A method as defined in claim 20 in which the further polymerizable prepolymer product of Step (A) has a viscosity equivalent to that of about 365 poises at 270° C. at zero shear rate.

28. A method as defined in claim 20 in which the prepolymer product of Step (A) has a viscosity equivalent to that of about 1120 poises at 270° C. at zero shear rate.

* * * * *

UNITED STATES PATENT AND TRADEMARK OFFICE
CERTIFICATE OF CORRECTION

PATENT NO. : 4,154,920

DATED : May 15, 1979

INVENTOR(S) : Saleh A. Jabarin

It is certified that error appears in the above-identified patent and that said Letters Patent are hereby corrected as shown below:

The sole sheet of drawing should be deleted to insert the attached sheet of drawing therefor.

Signed and Sealed this

Sixteenth Day of October 1979

[SEAL]

Attest:

RUTH C. MASON
Attesting Officer

LUTRELLE F. PARKER
Acting Commissioner of Patents and Trademarks